(No Model.)

W. M. DWIGHT.
SHEATHING LATH.

No. 338,220. Patented Mar. 16, 1886.

Attest:
John Shuman.

Inventor:
William M. Dwight.
by his Atty
Thos. S. Sprague

UNITED STATES PATENT OFFICE.

WILLIAM M. DWIGHT, OF DETROIT, MICHIGAN.

SHEATHING-LATH.

SPECIFICATION forming part of Letters Patent No. 338,220, dated March 16, 1886.

Application filed October 29, 1885. Serial No. 181,265. (No model.)

*To all whom it may concern:*

Be it known that I, WILLIAM M. DWIGHT, of Detroit, in the county of Wayne and State of Michigan, have invented new and useful improvements in Sheathing-Lath; and I do hereby declare that the following is a full, clear, and exact description thereof, reference being had to the accompanying drawings, which form a part of this specification.

This invention relates to a new and useful improvement in sheathing-lath, and the improvement consists in the peculiar formation of the grooves or "clinches," all as hereinafter described.

Figure 1:
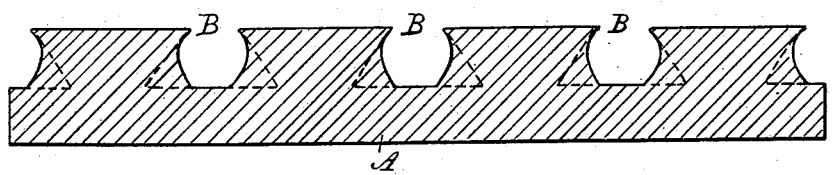
Figure 2:
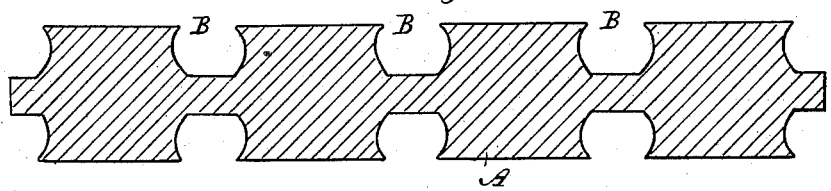
Figure 3:
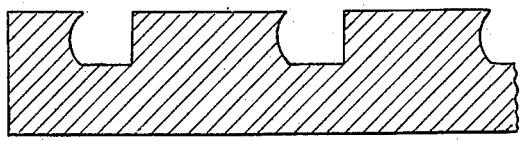
Figure 4:
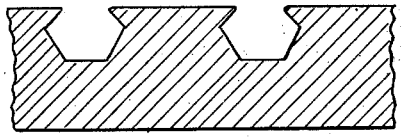

In the drawings which accompany this specification, Figure 1 is a cross-section through a sheathing lath-board of my improved manufacture. Fig. 2 is a cross-section through a double-sheathing lath-board of my improved manufacture. Figs. 3 and 4 are a modification of Fig. 1, more specifically referred to hereinafter.

A, in Fig. 1, is a sheathing-board provided on one side with a series of parallel grooves B, which in cross-section are substantially of the general form of square grooves with concave sides, so as to form near the face of the board a clinch for the mortar.

Fig. 2 shows a sheathing-board provided on both sides with a like series of parallel grooves B; and Fig. 3 represents a modification of Fig. 1, showing the grooves concave only on one side.

Heretofore in the manufacture of sheathing-lath the grooves B were made of the dovetail shape in cross-section, as shown in dotted lines in Fig. 1, so as to form clinches for the mortar. In comparing the two grooves together it will be seen that in order to make as good a clinch with the dovetail groove as with my improved form of groove the dovetail groove must have a much larger cross-section, consequently the sheathing-lath as such has less strength than the sheathing-lath of my improved manufacture. This is of importance, as it is very desirable to sacrifice as little of the strength of the board as possible, first, in view of its function as sheathing, and, second, in view of the action of the mortar or plaster, which, in drying, contracts, and, as experience has shown, exerts so much force on the face of the board that the latter is very liable to "coil" up—that is, become too weak—and thus give an uneven appearance to the plastered surface. This latter behavior is entirely overcome by plastering on both sides of the board, and to this end, and for the purpose of making an entirely fire-proof wall, I also intend to provide for these special purposes sheathing-lath which is grooved upon both sides in the same manner. This could not well be done under the old style of making dovetail grooves, as the latter would weaken the board so materially that it would lose all its strength.

A further advantage of my improvement is that as there is less cutting to be done, there is less work in making the article, besides the grooves are easier to cut than the dovetail.

In application for Letters Patent filed April 29, 1885, I have shown and described a machine for making this sheathing-lath.

The spirit of my invention also embraces the modification shown in Fig. 3, wherein the clinch is only formed by one side of the groove. It is also immaterial whether the concave form of the groove is strictly upon a curved line or upon straight lines, as in Fig. 4.

I am aware that a plastering-lath provided with a groove on each edge, either V-shaped or semicircular in form, is old. I am also aware that it has been proposed to form a sheathing-lath with angular recesses to form wedge-shaped portions. I lay no claim to either of these constructions. The first takes too long to lay, and, besides, they could not be used, as are mine, for sheathing or partitions. The other is costly of manufacture, and consumes too much time in plastering in getting the mortar well into the clings. I avoid these difficulties, and provide a cheap sheathing-lath, and where I form grooves in both sides, as in Fig. 2, one that can be used for partition-walls, where it can be plastered on both sides.

What I claim as my invention is—

1. As an improved article of manufacture, a board for the purpose described, provided with two or more grooves of substantially rectangular shape with concave sides, as set forth.

2. A sheathing-board provided upon its opposite sides with two or more parallel grooves of substantially rectangular shape with concave side or sides, substantially as and for the purpose specified.

WILLIAM M. DWIGHT.

Witnesses:
H. S. SPRAGUE,
E. W. ANDREWS.